United States Patent Office

2,882,303
Patented Apr. 14, 1959

2,882,303

PROCESS FOR PRODUCING ORGANOPHOSPHORUS COMPOUNDS

Jack Kwiatek, North Arlington, N.J., assignor to The M. W. Kellogg Company, Jersey City, N.J., a corporation No Drawing. Application May 5, 1953
Serial No. 353,241

28 Claims. (Cl. 260—543)

This invention relates to a new and improved process for the preparation of organophosphorus compounds. In one aspect this invention relates to a novel process for the production of organic phosphonyl halides and/or the corresponding phosphonic acids and derivatives derived therefrom. In still another aspect this invention relates to a novel process for the production of organic phosphine oxides.

The uses of such organophosphorus compounds are many as known to those skilled in the art and thus a suitable method for their quantity production on an economical basis is much needed. These compounds are valuable as intermediates for the preparation of more complex organophosphorus derivatives. They are useful in themselves or as constituents of insecticides, fungicides, pharmaceuticals. These organophosphorus compounds are also used as petroleum additives and polymer additives, particularly in improving the quality of lubricating oils.

Prior art methods for the production of organophosphorus compounds, such as the organic phosphonyl halides and the organic phosphine oxides, are devious and roundabout and involve many mechanical and chemical steps, characterized by poor yields and high costs.

An object of the present invention is to provide a novel process for the production of organophosphorus compounds.

Another object is to provide a novel and more direct process for the production of organic phosphonyl halides and organic phosphine oxides.

Still another object is to provide a novel method for the production of such organophosphorus compounds from a readily available source of raw materials.

A still further object is to produce such organophosphorus compounds by a process which is more economical than prior art methods.

Another object is to produce phosphonic acids and derivatives thereof.

An additional object is to provide such a method which gives good yields and selectivity of organic phosphonyl halides and organic phosphine oxides.

Various other objects and advantages may become aparent to those skilled in the art from the accompanying description and disclosure.

According to the present invention an organic halide having only a continuous carbon skeleton, a trivalent phosphorus halide, and a compound containing a phosphoryl group are reacted under conditions to produce an organophosphorus compounds, such as the organic phosphonyl halides, the corresponding phosphonic acids and derivatives derived therefrom, and organic phosphine oxides. The reactants may be reacted or added to the reaction zone simultaneously or in any sequence without departing from the scope of this invention. For example, the organic halide may be reacted with the trivalent phosphorus halide, and the product thus obtained reacted with the compound containing the phosphoryl group under conditions to produce an organic phosphonyl halide and/or an organic phosphine oxide.

The organic halides employed according to this invention are the unsubstituted and substituted hydrocarbon halides, such as the alkyl, cycloalkyl and aromatic halides, preferably having less than fifteen carbon atoms per molecule. The substituted alkyl and cycloalkyl halides are preferably those in which one or more hydrogen atoms is substituted by a corresponding number of radicals selected from the group consisting of the halogens, nitro group, cyano group, aryl groups, and sulfone group. The aromatic halides are those in which the halogen atom is activated by the presence of a nitro group, preferably at least two in the ortho and para positions of the aromatic ring. The following compounds are given as examples of suitable organic halides which may be used by this novel process and are in no way to be construed as limiting the scope of this invention: methyl chloride, ethyl bromide, isopropyl chloride, cyclopentyl chloride, hexachlorocyclohexane, tetradecyl chloride, carbon tetrachloride, trichloromethyl bromide, 1,1-difluoro-1-chloro-2,2,2-trichloroethane, cyclohexyl bromide, hexachloro hexane, benzyl iodide, fluorobenzo dichloride, 2-cyano-1-chloroethane, trichlorocyanopropane, nitrotrichloromethane, 2,4 - dinitrochlorobenzene, para-nitrochlorobenzene, 2,4-dinitrobromobenzene, phenyl β-chloropropyl sulfone, and phenyl β-chloroethyl sulfone. Mixtures of different organic halides may be used in accordance with this invention and in such case mixtures of products will be obtained. Although any of the halogens are suitable as the halogen of the organic halide, the gaseous halogens are preferred and chlorine has been found to be the most preferable and the more economical of the halogens. The alkyl halides may be prepared in conventional manner known to those skilled in the art.

Both inorganic and organic trivalent phosphorus halides may be used as the phosphorus halide reactant of the present invention. Typical examples of inorganic trivalent phosphorus halides are as follows: phosphorus trifluoride, phosphorus trichloride, phosphorus tribromide and phosphorus triiodide; mixed phosphorus halides, such as difluorophosphorus chloride, difluorophosphorus iodide, dichlorophosphorus fluoride, chlorobromophosphorus fluoride and dichlorophosphorus bromide; and diphosphorus tetraiodide. The preferred organic trivalent phosphorus halides which may be used in accordance with this invention are the hydrocarbon phosphorus halides having only a continuous carbon skeleton of not more than 15 carbon atoms, such as the alkyl and cycloalkyl phosphorus halides, either substituted or unsubstituted, and the aromatic phosphorus halides, either substituted or unsubstituted. In general, the organic radical of the organic phosphorus halide is selected from the same classes as the organic halides previously discussed, and may be the same or different than the organic radical of the organic halide. Typical examples of organic phosphorus halides are methyl phosphorus dichloride, ethyl phosphorus difluoride, isopropyl phosphorus dichloride, benzyl phosphorus dichloride, phenyl phosphorus diiodide, diphenyl phosphorus chloride, 4-nitrophenyl phosphorus dibromide, 4-bromophenyl phosphorus dichloride, methyl ethyl phosphorus chloride, diethyl phosphorus bromide, dibenzyl phosphorus chloride, dipropyl phosphorus chloride, cyclohexyl phosphorus dichloride, cyclopentyl phosphorus dibromide and cyclooctyl bromo phosphorus chloride. The halogen of the trivalent phosphorus halide may be any of the halogens, preferably the gaseous halogens, such as chlorine, without departing from the scope of the invention.

The particular trivalent phosphorus halide employed depends upon the ultimate product desired. When producing an organic phosphonyl dibromide, for example, phosphorus tribromide is preferred. When producing an organic phosphonyl monochloride in which the two organic radicals linked to the phosphorus atom may or may not be the same, an organic phosphorus dichloride is preferably employed in which the organic radical may or may not be the same as the organic radical of the organic halide reactant. Mixtures of trivalent phosphorus halides may be employed without departing from the scope of this invention.

The aliphatic and aromatic phosphorus halides may be prepared by reacting a phosphorus trihalide, such as the trichloride, with a dialkyl, dicycloalkyl, or diacyl mercury derivative at a temperature of 180° C. to 230° C. The dihalides are first produced and by continuing the heating for a further length of time the monohalide may be produced and recovered. The aromatic phosphorus halides may also be produced by reacting an aromatic hydrocarbon with a phosphorus trihalide in the presence of a Friedel-Crafts catalyst, such as aluminum chloride.

The reactant containing the phosphoryl group which may be used in accordance with this invention includes both inorganic and organic phosphoryl compounds. The preferred phosphoryl compounds are the inorganic phosphoryl trihalides $$\overset{O}{\underset{}{\overset{\|}{P}X_3}}$$

Typical examples of phosphoryl trihalides are phosphoryl trifluoride, phosphoryl trichloride, and phosphoryl tribromide, and the mixed phosphoryl trihalides, such as bromo phosphoryl dichloride, dichloro phosphoryl fluoride, chlorophosphoryl difluoride, difluoro phosphoryl bromide, and iodo phosphoryl dichloride. Typical examples of organic phosphoryl halides which give satisfactory yields of product are the unsubstituted and substituted hydrocarbon phosphonyl halides, such as the alkyl, cycloalkyl and aromatic phosphonyl halides having less than 15 carbon atoms per molecule; examples of which are: methane phosphonyl dichloride, methoxy methane phosphonyl dichloride, 4-methylphenyl phosphonyl chlorobromide, cyclopentane phosphonyl difluoride, cyclohexane phosphonyl dichloride, diethyl phosphonyl chloride, benzyl phosphonyl dichloride, benzene phosphonyl dichloride, 4-methylbenzene phosphonyl dibromide and 2-ethylbenzene phosphonyl dichloride. Phosphoryl trichloride and phosphoryl tribromide have been found to be the preferable phosphoryl compounds employed in accordance with this invention, although the selection of a particular phosphoryl compound may be influenced by many factors including product and availability. Since only the phosphoryl radical of the compound enters into the reaction, the other elements are not so important and may constitute a wide selection. The most important criterion being that the other elements or radicals do not interfere with the reaction. The organic phosphonyl halide reactant may be obtained as a by-product of the present process and when recovered by distillation may be recycled to the reaction zone to supplement the extraneous source of the phosphoryl group. For example in the production of methane phosphonyl dichloride, chloro methane phosphonyl dichloride may be a by-product which is separated and recycled to increase the yield of the desired product. Mixtures of phosphonyl compounds may be employed without departing from the scope of this invention.

The organic phosphonyl halide reactants may be produced by reacting the corresponding phosphonic acid with phosphorus pentahalide, such as the pentachloride, at room temperature. Aliphatic phosphonyl halides having at least 5 carbon atoms may also be produced by reacting an aliphatically bound hydrogen atom of a hydrocarbon with phosphorus trihalide, such as the trichloride, by blowing free oxygen through the reaction mixture at room temperature.

In general the organic reactants may include as much as 15 carbon atoms in the molecule and in a single chain, preferably, however, the number of carbon atoms per molecule and in a single carbon chain is not more than 8.

The process described herein may be carried out with or without the presence of a catalyst, but the use of a catalyst is preferred. Suitable catalysts comprise those of the metal iodide type, such as sodium iodide, potassium iodide, aluminum iodide, zinc iodide and nickel iodide; both inorganic divalent phosphorus iodides and organic phosphonium iodides, such as phosphorus diiodide and tetramethyl phosphonium iodide; free iodine; and Friedel-Crafts type catalysts, such as aluminum chloride, aluminum bromide, zinc chloride and boron trifluoride. Small amounts of phosphorus triiodide and methyl iodide, although classed as reactants may act as catalysts when other reactants are used as the principal reactants. The catalyst is generally employed in an amount between about 0.01 mole and about 1.5 moles per mole of phosphoryl compound. Preferably, between about 0.02 mole and about 0.5 mole of catalyst is employed per mole of phosphoryl compound.

The mole ratio of trivalent phosphorus halide to phosphoryl compound can vary over a wide range, such as between about 0.01 and about 10, but it is preferable to use between about 0.1 and about 5 moles of phosphoryl compound per mole of trivalent phosphorus halide, usually less than a ratio of about 1:1.

Generally, the organic halide is employed in an amount between about 0.2 mole and about 10 moles per mole of phosphoryl compound, preferably between about 0.5 and about 5 moles per mole of phosphoryl compound.

An organic phosphonyl dihalide may be produced without the use of added trivalent phosphorus halide as exemplified by Equation 6 below. The yields for this reaction are relativeely low and it is, therefore, preferred to add an amount of trivalent phosphorus halide, such as phosphorus trichloride, in accordance with the previous discussion.

The theory and typical reaction mechanism advanced in explaining the invention should not be construed as unnecessarily limiting thereto and may not be the only explanation for the reactions and products produced. The essence of the process resides in the addition of certain reactants to the reaction zone which produce the products of this invention under appropriate conditions of reaction.

General reactions involved for the production of organophosphorus compounds according to this invention can be illustrated by the following typical reactions where ≡P=O is used to represent the phosphoryl compound:

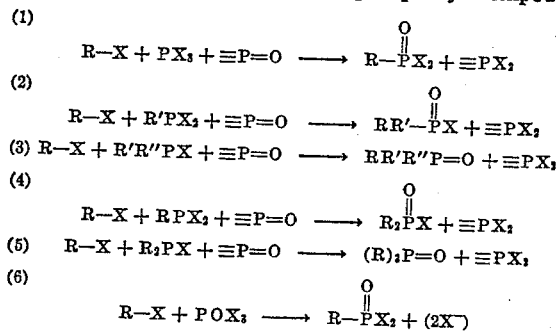

where R, R' and R" are organic radicals and may be the same or different and where X is a halogen atom. As previously indicated in discussing the organic radicals of the reactants, R, R' and R" are preferably substituted or unsubstituted alkyl or cycloalkyl radicals, or aromatic radicals and may be defined in accordance with the expressions used in defining the respective reactants (organic halide and trivalent phosphorus halide). Although X may be any of the halogens without departing from the scope of this invention, preferably X is a gaseous halogen, such as chlorine and fluorine.

The process of the invention is carried out at a temperature between about room temperature (22° C.) and the decomposition temperature of the reactants. Generally, the temperature will be below about 350° C. The process of the invention may be effected at elevated temperatures by introducing the individual reactants, either separately or together, into the reaction zone, preferably a steel bomb, and carrying out the reaction under autogeneous conditions of pressure as a matter of convenience. The preferred temperature range is between about 150° C. and about 250° C. The time of reaction may vary over relatively wide limits, such as between about 10 minutes and about 20 hours, but the preferable reaction time has been found to be between about 1 and about 8 hours.

Any free iodine formed during the course of the reaction is conveniently removed by treating the products with mercury, followed by removal of the mercury salts. Products are purified by conventional methods, such as fractional distillation of liquids and crystallization of solid products. The identification of the products is achieved by conventional methods, such as chemical analysis for percent composition, mass spectrometer analysis, and determination of physical constants and infrared absorption analysis.

When phosphonyl halides are produced they may be hydrolyzed by conventional methods known to those skilled in the art to the corresponding phosphonic acids which in turn may be converted to various phosphonic acid esters also by conventional methods, or the phosphonyl halides may be converted directly to their corresponding esters by conventional methods.

The reaction may be carried out in continuous or batchwise systems without departing from the scope of this invention. The reaction may also be effected in the presence of liquid diluents, such as benzene, nitrobenzene, toluene, and hexane, in which the reactants are dissolved or are dispersed by mechanical agitation or by emulsifying agents.

It is to be understood that the procedure employed for the isolation of desired products will vary in accordance with the physical nature of the products, and that the temperature of reaction, molar quantities of reactants, and type catalyst to be preferred in any instance will depend upon the raw materials employed and the products desired.

The following examples are offered as a better understanding of the present invention, but the examples are not to be considered as unnecessarily limiting the present invention:

*Example 1*

A 200 ml. steel pressure bomb was charged with 35 grams (0.69 mole) of methyl chloride, 53 ml. (0.6 mole) of phosphorus trichloride, 55 ml. (0.6 mole) of phosphoryl trichloride and 42.7 grams (0.15 mole) of phosphorus diiodide. The bomb was then closed, placed in the reciprocating shaker and electrically heated to 250° C. and held at this temperature for 7 hours. After cooling, the bombs were vented to atmospheric pressure. A mixture was removed from the bomb and heated in a distilling flask until no more liquid was obtained by removing a vaporous overhead product and condensing same. This liquid was separated into a low boiling fraction (44°–120° C.) and a high boiling fraction (100°–195° C.) by distillation at atmospheric pressure. Free iodine was removed from the low boiling fraction by shaking with mercury followed by removal of the mercury salts by filtration with nitrogen pressure. The high boiling fraction was diluted with purified chloroform and shaken with mercury followed by removal of the mercury salts by filtration with nitrogen pressure. The major proportion of the low boiling fraction was inorganic phosphorus compounds ($PCl_3$ and $POCl_3$). The high boiling fraction was redistilled at atmospheric pressure. A fraction boiling at 140°–166° C. was obtained and subjected to mass spectrometer analysis. This fraction contained 70 mole per cent of methane phosphonyl dichloride (37.3 grams).

*Example 2*

A 200 ml. steel pressure bomb was charged with a mixture consisting of 42.6 grams (0.84 mole) of methyl chloride, 53 ml. (0.6 mole) of phosphorus trichloride, 50.2 grams (0.3 mole) of chloromethane phosphonyl dichloride and 42.7 grams (0.15 mole) of phosphorus diiodide as the catalyst. The bomb was then closed, placed in the reciprocating shaker and electrically heated to 250° C. and held at this temperature for 7 hours. After cooling, the bomb was vented to atmospheric pressure. A mixture was removed from the bomb and heated in a distilling flask until no more liquid was obtained as an overhead product. This liquid was separated into a low boiling fraction (68–123° C.) and a high boiling fraction (123°–219° C.) by distillation at atmospheric pressure. Free iodine was removed from the low boiling fraction by shaking with mercury followed by removal of the mercury salts by filtration pressured with nitrogen. The high boiling fraction was diluted with purified chloroform and shaken with mercury followed by removal of the mercury salts by filtration pressured with nitrogen. The major proportion of the low boiling fraction was inorganic phosphorus compounds. The high boiling fraction was redistilled at atmospheric pressure. A fraction boiling at 150°–166° C. was obtained and subjected to mass spectrometer analysis. This fraction contained 13.2 grams of methane phosphonyl dichloride.

*Example 3*

Example 2 was repeated except that 32.7 grams (0.65 mole) of methyl chloride was used and 47.9 grams (0.15 mole) of zinc iodide was used as the catalyst. Also 27 ml. (0.3 mole) of phosphoryl trichloride was added in addition to the organic phosphonyl dichloride. A substantial amount of methane phosphonyl dichloride was obtained and identified as described in Example 2. The high boiling fraction amounted at 37.8 grams and about 95 mol percent of this was methane phosphonyl dichloride.

*Example 4*

A 200 ml. steel pressure bomb was charged with 20.2 grams (0.4 mole) of methyl chloride, 70 ml. (0.8 mole) of phosphorus trichloride, 65.2 grams (0.4 mole) of methoxymethane phosphonyl dichloride and 25.1 grams (0.8 mole of nickel iodide. The bomb was then closed, placed in the reciprocating shaker and electrically heated to 250° C. and held at this temperature for 7 hours. After cooling, the bomb was vented to atmospheric pressure. The mixture was removed from the bomb and heated in a distilling flask until no more liquid was obtained. This liquid was separated into a low boiling fraction (64°–90° C.) and a high boiling fraction (90°–195° C.) by distillation at atmospheric pressure. Free iodine was removed from the liquid fractions as described in Examples 1 and 2. The high boiling fraction was redistilled at atmoshperic pressure. A fraction boiling at 150°–163° C. was obtained. This fraction mounted to 25.3 grams and 95 mol percent of this was methane phosphonyl dichloride.

*Example 5*

A 200 ml. steel pressure bomb was charged with 55.5 grams (0.6 mole) of n-butyl chloride, 52 ml. (0.6 mole) of phosphorus trichloride, 55 ml. (0.6 mole) of phosphoryl trichloride and 7.62 grams (0.03 mole) of free iodine. The bomb was closed, placed in a reciprocating shaker, heated to 250° C. and held at this temperature for four hours. The total crude product in the bomb was transferred to a distillation flask and heated at atmospheric pressure to obtain a liquid as overhead product. This liquid fraction was freed of iodine by shaking with mercury followed by filtration to remove the mercury iodide salts. The filtrate was then subjected to distillation at atmospheric pressure and yielded a fraction with a boiling point of 132° C. to 210° C. most of which was collected above 200° C. This fraction contained a substantial amount of butane phosphonyl dichloride.

Phosphine oxides and other organic phosphonyl halides which may be produced in accordance with the foregoing description and examples are: trimethyl phosphine oxide, tripropyl phosphine oxide, dimethyl ethyl phosphine oxide, methyl diphenyl phosphine oxide, methyl ethyl phenyl phosphine oxide, methyl phenyl benzyl phosphine oxide, dimethyl phosphonyl chloride, methyl ethyl phosphonyl chloride, dipropyl phosphonyl chloride, ethyl phenyl phosphonyl chloride, methyl phenyl phosphonyl chloride, dimethyl phosphonyl bromide, methyl ethyl phosphonyl bromide, 2-chloroethane phosphonyl dichloride, cyclohexane phosphonyl dichloride, tertiary butane phosphonyl dichloride and 2-chloroethane phosphonyl dibromide.

This invention relates to a process of interacting an organic halide, a trivalent phosphorus halide and a phosphonyl group in any sequence of steps in single or multiple reaction zones and various modifications and alterations of procedure and operating conditions may become apparent to those skilled in the art without departing from the scope of this invention.

Having described my invention, I claim:

1. A process which comprises introducing into a reaction zone a phosphorous trihalide, a compound containing a trivalent phosphoryl group ($\equiv P=O$) in which the phosphorus atom is linked to a halogen atom and is further linked to two atoms selected from the group consisting of halogen and carbon of a hydrocarbon radical having less than 15 carbon atoms, and a hydrocarbon halide in which the halogen is linked directly to a carbon of a hydrocarbon radical having less than 15 carbon atoms and contacting such compounds in said reaction zone for a sufficient period of time at a temperature between about room temperature and about 350° C. to produce an organic phosphonyl dihalide.

2. A process which comprises introducing into a reaction zone a phosphorous trihalide, a compound containing a trivalent phosphoryl group ($\equiv P=O$) in which the phosphorus atom is linked to a halogen atom and is further linked to two atoms selected from the group consisting of halogen and carbon of a hydrocarbon radical having less than 15 carbon atoms, and a hydrocarbon halide in which the halogen is linked directly to a carbon of a hydrocarbon radical containing less than 15 carbon atoms selected from the group consisting of the unsubstituted alkyl and cycloalkyl halides, the substituted alkyl and cycloalkyl halides substituted with at east one substituent selected from the group consisting of halogens, nitro group, cyano group, aryl group, sulfone group, and the nitro substituted aromatic halides; and contacting such compounds in said reaction zone for a sufficient period of time at a temperature between about 150° C. and about 350° C. to produce an organic phosphonyl dihalide.

3. A process which comprises introducing into a reaction zone a compound containing a trivalent phosphoryl group ($\equiv P=O$) in which the phosphorus atom is linked to a halogen atom and is further linked to two atoms selected from the group consisting of halogen and carbon of a hydrocarbon radical having less than 15 carbon atoms, about 0.01 mol to about 10 mols of a prosphorous trihalide per mol of compound containing the phosphoryl group and about 0.2 mol to about 10 mols of a hydrocarbon halide in which the halogen is linked directly to a carbon of a hydrogen radical having less than 15 carbon atoms per mol of the compound containing the phosphoryl group; said hydrocarbon halide being selected from the group consisting of the unsubstituted alkyl and cycloalkyl halides, the alkyl and cycloalkyl halides substituted with at least one substituent selected from the group consisting of halogens, nitro group, cyano group, aryl group, and sulfone group, and the nitro substituted aromatic halides; and contacting said compounds for a period of time between about 10 minutes and about 20 hours at a temperature between about 150° C. and about 350° C. to produce an organic phosphonyl dihalide.

4. The process of claim 3 in which the reaction is effected in the presence of phosphorus diiodide as a catalyst.

5. The process of claim 3 in which the reaction is effected in the presence of zinc iodide as a catalyst.

6. The process of claim 3 in which the reaction is effected in the presence of free iodine as a catalyst.

7. The process of claim 3 in which the reaction is effected in the presence of methyl iodide as a catalyst.

8. The process of claim 3 in which the reaction is effected in the presence of nickel iodide as a catalyst.

9. The process of claim 3 in which said phosphorous trihalide is phosphorus trichloride.

10. The process of claim 3 in which said phosphorous trihalide is phosphorus tribromide.

11. The process of claim 3 in which said phosphorous trihalide is dichloro phosphorus fluoride.

12. The process of claim 3 in which said compound containing a phosphoryl group is an inorganic phosphoryl trihalide.

13. The process of claim 3 in which said compound containing a phosphoryl group is phosphoryl trichloride.

14. The process of claim 3 in which said compound containing a phosphoryl group is phosphoryl tribromide.

15. The process of claim 3 in which said compound containing a phosphoryl group is phosphoryl trifluoride.

16. The process of claim 3 in which said compound containing a phosphoryl group is an alkyl phosphonyl halide.

17. The process of claim 3 in which said compound containing a phosphoryl group is chloromethane phosphonyl dichloride.

18. The process of claim 3 in which said compound containing a phosphoryl group is methoxymethane phosphonyl.

19. The process of claim 3 in which said hydrocarbon halide is methyl chloride.

20. The process of claim 3 in which said hydrocarbon halide is n-butyl chloride.

21. The process of claim 3 in which said hydrocarbon halide is benzyl iodide.

22. The process of claim 3 in which said hydrocarbon halide is trichloromethyl bromide.

23. The process of claim 3 in which said hydrocarbon halide is 1,1-difluoro-1-chloro-2,2,2-trichloroethane.

24. A process for the production of methane phosphonyl dichloride which comprises introducing into a reaction zone phosphorus trichloride, methyl chloride and phosphoryl trichloride and maintaining contact therebetween for a period of time between about 10 minutes and about 20 hours at a temperature between about 150° C. and about 350° C. in the presence of phosphorus diodide as a catalyst to produce methane phosphonyl dichloride, and recovering methane phosphonyl dichloride thus produced as a product of the process.

25. A process for providing methane phosphonyl dichloride which comprises introducing into a reaction zone phosphorus trichloride, chloromethane phosphonyl dichloride and methyl chloride and maintaining contact therebetween for a sufficient period of time at a temperature between about 150° C. and about 350° C. in the presence of zinc iodide as a catalyst to produce methane phosphonyl dichloride, and recovering methane phosphonyl dichloride thus produced as the product of the process.

26. A process for producing methane phosphonyl dichloride which comprises introducing into a reaction zone phosphorus trichloride, methoxymethane phosphonyl dichloride and methyl chloride and maintaining contact therebetween for a sufficient period of time at a temperature between about 150° C. and about 350° C. in the presence of nickel iodide as a catalyst to produce methane phosphonyl dichloride, and recovering methane phosphonyl dichloride as a product of the process.

27. A process for the production of butane phosphonyl dichloride which comprises introducing into a reaction zone phosphorus trichloride, n-butyl chloride, phosphoryl trichloride and maintaining contact therebetween for a sufficient period of time at a temperature between about 150° C. and about 350° C. in the presence of free iodine as a catalyst to produce butane phosphonyl dichloride and recovering butane phosphonyl dichloride thus produced as a product of the process.

28. A process for the production of methane phosphonyl dichloride which comprises introducing into a steel bomb phosphorus trichloride, methyl chloride and phosphoryl trichloride, and phosphorus diiodide as a catalyst and maintaining contact therebetween for about 7 hours at a temperature of about 250° C. to produce methane phosphonyl dichloride, and recovering methane phosphonyl dichloride thus produced as a product of the process.

References Cited in the file of this patent

UNITED STATES PATENTS

| | | |
|---|---|---|
| 2,500,022 | Brown | Mar. 7, 1950 |
| 2,668,179 | Tolkmith | Feb. 2, 1954 |
| 2,683,168 | Jensen et al. | July 6, 1954 |

FOREIGN PATENTS

| | | |
|---|---|---|
| 497,548 | Belgium | Dec. 1, 1950 |

OTHER REFERENCES

Michaelis: Liebig's Annalen, vol. 326 (1903), pp. 140, 183.

Kosolapoff: Organophosphorous Compounds, John Wiley & Sons, N.Y.C. (1950), pp. 133, 281, 289.

Clay: Jour. Organic Chemistry 16, pp. 892–894 (1951).

UNITED STATES PATENT OFFICE
CERTIFICATE OF CORRECTION

Patent No. 2,882,303 April 14, 1959

Jack Kwiatek

It is hereby certified that error appears in the printed specification of the above numbered patent requiring correction and that the said Letters Patent should read as corrected below.

Column 6, line 44, for "amounted at" read -- amounted to --; line 52 after "0.8 mole" insert a closing parenthesis; column 7, line 70, for "prosphorous" read -- phosphorous --; column 8, line 66, for "providing" read -- producing --.

Signed and sealed this 20th day of October 1959.

(SEAL)
Attest:

KARL H. AXLINE
Attesting Officer

ROBERT C. WATSON
Commissioner of Patents